United States Patent [19]

Frey et al.

[11] 4,026,885
[45] May 31, 1977

[54] PROCESS FOR THE MANUFACTURE OF CATIONIC HYDRAZONE DYES

[75] Inventors: Christian Frey, Muttenz; Peter Moser, Binningen, both of Switzerland

[73] Assignee: Ciba-Geigy Corporation, Ardsley, N.Y.

[22] Filed: Apr. 27, 1976

[21] Appl. No.: 680,638

[30] Foreign Application Priority Data

May 13, 1975 Switzerland ............... 6114/75
Apr. 7, 1976 Switzerland ............... 4363/76

[52] U.S. Cl. ............................................. 260/240 G
[51] Int. Cl.² ............... C09B 55/00; C07D 211/72; C07D 215/06
[58] Field of Search ........ 260/566 B, 566 D, 240 G

[56] References Cited

UNITED STATES PATENTS

| | | | |
|---|---|---|---|
| 3,635,955 | 1/1972 | Hansen et al. | 260/240 G |
| 3,741,982 | 6/1973 | Fujino et al. | 260/240 G X |
| 3,769,279 | 10/1973 | Kuhlthau et al. | 260/240 G |
| 3,829,418 | 8/1974 | Raue et al. | 260/240 G |
| 3,897,418 | 7/1975 | Kuhlthau | 260/240 G |

FOREIGN PATENTS OR APPLICATIONS 206,549  12/1959  Austria ................ 260/240 G

*Primary Examiner*—Allen B. Curtis
*Attorney, Agent, or Firm*—Karl F. Jorda; Edward McC. Roberts; Michael W. Glynn

[57] ABSTRACT

A process for the manufacture of dyes of the formula

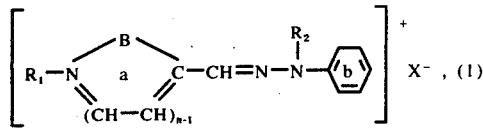

wherein each of $R_1$ and $R_2$ represents a methyl or ethyl radical, $n$ is 1 or 2, $X^-$ is the charge equivalent of an anion and B represents a divalent radical which completes the ring $a$ to form a pyridinium or quinolinium ring which is unsubstituted or substituted by chlorine or methyl, and the ring $b$ is unsubstituted or substituted by low molecular alkyl or alkoxy or by halogen, which process comprises treating a compound of the formula

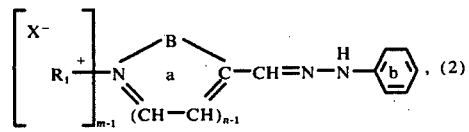

wherein $R_1$, $n$, $X^-$, B, $a$ and $b$ are as defined in formula (1) and $m$ is 1 or 2, in aqueous medium at a pH of 12 or above, with dimethyl or diethyl sulphate, with the proviso that if $m=1$, at least 2 equivalents of dimethyl or diethyl sulphate are used.

8 Claims, No Drawings

PROCESS FOR THE MANUFACTURE OF CATIONIC HYDRAZONE DYES

The present invention relates to the manufacture of dyes of the formula

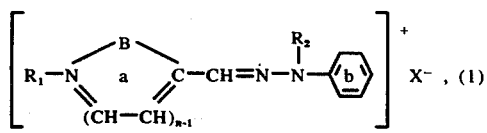

wherein each of $R_1$ and $R_2$ represents a methyl or ethyl radical, $n$ is 1 or 2, $X^-$ is the charge equivalent of an anion and B represents a divalent radical which completes the ring $a$ to form a pyridinium or quinolinium ring which is unsubstituted or substituted by chlorine or methyl, and the ring $b$ is unsubstituted or substituted by low molecular alkyl or alkoxy or by halogen.

It has now been found that it is possible to obtain these dyes by treating a compound of the formula

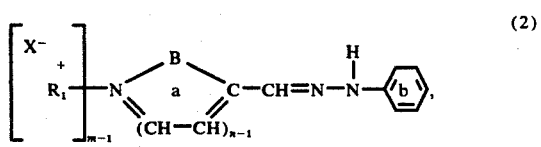

wherein $R_1$, $n$, $X^-$, B, $a$ and $b$ are as defined in formula (1), and $m$ is 1 or 2, in aqueous medium at a pH of 12 or above, with dimethyl or diethyl sulphate, with the proviso that if $m = 1$, at least 2 equivalents of dimethyl or diethyl sulphate are used.

Unexpectedly, the dimethyl or diethyl sulphate reacts with the hydrazone at the high pH value of 12 and above necessary for the deprotonisation of the hydrazone nitrogen atom and is not substantially deomposed by hydrolysis, so that an aqueous alkylation of the dyes of the formula (2) is surprisingly possible. Compared with the conventional alkylation in organic solvents, the advantages of the aqueous reaction are that no recovery of solvents is necessary and that the process can be carried out at a lower temperature. Furthermore, the aqueous process of the invention has still further advantages. Thus it is no longer necessary to dry the starting product of the formula (2) before the reaction; instead it can be used as moist filter cake or it need not be isolated at all. The novel process therefore makes it possible to alkylate twice hydrazone obained from phenylhydrazines and pyridine aldehydes or quinoline aldehydes in the same reaction vessel without isolating the intermediate, for example in accordance with the reaction sheme

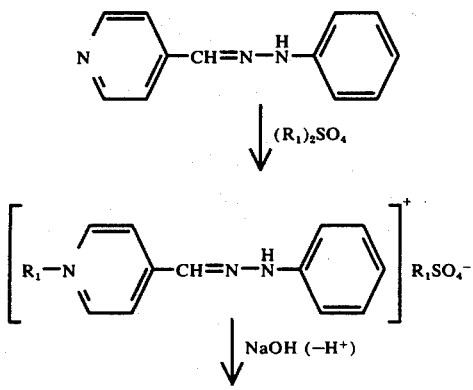

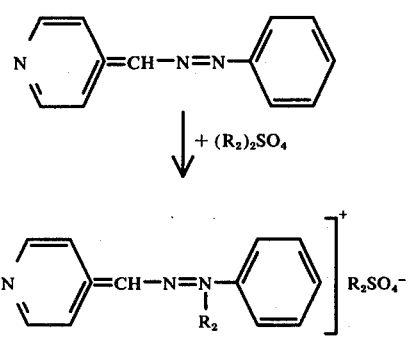

According to the method of the present invention, it is possible to alkylate, for example, the hydrazone obtained from phenylhydrazine, methoxy-, chloro- or bromophenylhydrazine and pyridine-4-aldehyde, pyridine-2-aldehyde or quinoline-4-aldehyde, in aqueous solution, both at the heterocyclic nitrogen and at the hydrazone nitrogen atom.

The alkylation at the heterocyclic nitrogen atom is carried out in weakly alkaline medium at pH 4 to 8, for example in the presence of bicarbonates or carbonates of alkalies or alkaline earths or of alkaline earth oxides or hydroxides, preferably at temperatures of 15° to 40° C, or else under the same conditions as for the alkylation at the hydrazone nitrogen atom.

A pH of 12 to 13 is preferred for the alkylation at the hydrzone nitrogen atom. The pH is advantageously adjusted by adding concentrated sodium hydroxide solution. The process is carried out at temperatures below 30° C, preferably at 0° to 22° C.

The process of the present invention is economically advantageous, since no solvent is used either for the alkylation at the pyridine nitrogen atom or for that at the hydrazone nitrogen atom.

Furthermore, high concentrations can be used in the process. The weight ratio of dye to water is normally between 1:30 and 1:3.

The quaternisation takes place at relatively low temperatures and therefore results in the formation of less degradation products than, for example, a quaternisation in chlorobenzene, which is usually carried out at temperatures in the region of 100° C.

A particular advantage of the process is also that starting products which are readily obtainable can be used. The hydrazone dyes of the formula (1) can now be obtained in simple manner starting from primary phenylhydrazines. It is no longer necessary to use the expensive methyl- or ethyl-phenylhydrazines.

The invention is illustrated by the following Examples, in which the parts and percentages are by weight unless otherwise stated.

EXAMPLE 1

19.7 parts of the condensation product of pyridine-4-aldehyde and phenylhydrazine are suspended in 250 parts of water. After addition of 2 parts of magnesium oxide, 25.2 parts of dimethyl sulphate are added dropwise, with stirring, at 25°–30° C. The reaction mixture is stirred for a further 2 hours and the resultant dye solution is then filtered. The filtrate is then cooled to 0°

C and 10 parts of dimethyl sulphate and thereafter 40 parts of 30% sodium hydroxide solution are added. The reaction mixture is stirred for 1 hour and the internal temperature is kept below 20° C by adding ice. The pH is then adjusted to 4–5 with concentrated hydrochloric acid and the dye of the formula

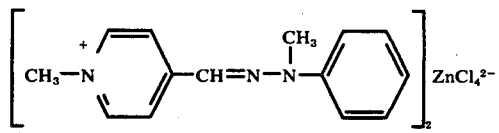

is precipitated by the dropwise addition of 13 parts of 50% zinc chloride solution. The dye colours polyacrylonitrile material in yellow shades.

EXAMPLE 2

180 parts of the moist compound of the formula

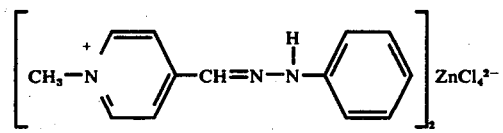

(corresponds to 130 parts of the dry compound) are stirred in 300 parts of a mixture of water and ice. Dimethyl sulphate (86.3 parts) is added thereto and thereafter 150 parts by volume of 40% sodium hydroxide solution are added in the course of 15 minutes, whereupon the reaction mixture warms. The temperature is kept at 18°–22° C by adding ice and the batch is stirred for 1 hour at this temperature. The pH is then adjusted to 0.5 to 1 with conc. HCl and the acid mixture is heated to 60° C. The dye is precipitated by adding 8 parts by volume of 50% zinc chloride solution.

EXAMPLE 3

29.6 parts of 4 -pyridine aldehyde-phenylhydrazone are stirred in 90 parts of a mixture of water and ice. Dimethyl sulphate (57 parts) is added thereto and then 57 parts by volume of 30% sodium hydroxide solution are added dropwise in the course of app. 10 minutes. The temperature of the reaction mixture is kept between 10° and 22° C by adding ice. Stirring is continued for 1 hour, then the pH is adjusted to 0.5 and the mixture is heated to 50° C. The dye is precipitated by adding 57 parts by volume of 50% zinc chloride solution.

The same dye is obtained as that in the process described in Example 1.

We claim:

1. A process for the manufacture of dyes of the formula

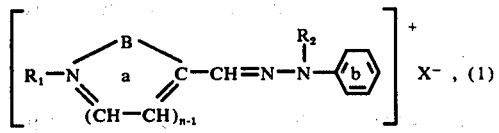

wherein each of $R_1$ and $R_2$ represents a methyl or ethyl radical, $n$ is 1 or 2, $X^-$ is the charge equivalent of an anion and B represents a divalent radical which completes the ring $a$ to form a pyridinium or quinolinium ring which is unsubstituted or substituted by chlorine or methyl, and the ring $b$ is unsubstituted or substituted by low molecular alkyl or alkoxy or by halogen, which process comprises treating a compound of the formula

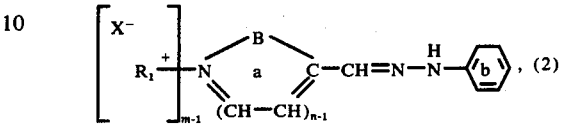

wherein $R_1$, $n$, $X^-$, B, $a$ and $b$ are as defined in formula (1) and $m$ is 1 or 2, in aqueous medium at a pH of 12 or above, with dimethyl or diethyl sulphate, with the proviso that if $m = 1$, at least 2 equivalents of dimethyl or diethyl sulphate are used.

2. A process according to claim 1, wherein the aqueous reaction mixture which is obtained by reacting a hydrzone of the formula

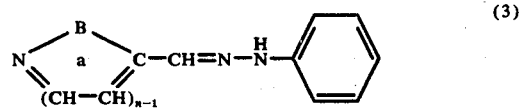

wherein $n$, B, $a$ and $b$ are as defined in claim 1, in aqueous medium at a pH of 4 to 8, with dimethyl of diethyl sulphate, is treated at a pH of 12 or above once more with dimethyl or diethyl sulphate.

3. A process according to claim 1, wherein a start is made from a compound of the formula

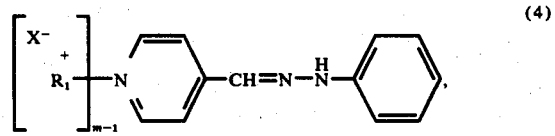

wherein $R_1$, $m$ and $X^-$ are as defined in claim 1.

4. A process according to claim 1, wherein a start is made from a compound of the formula

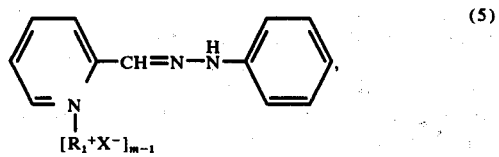

wherein $R_1$, $m$ and $X^-$ are as defined in claim 1.

5. A process according to claim 1, wherein the reaction is carried out at temperatures of at most 30° C.

6. A process according to claim 1, wherein the reaction is carried out at 0° to 22° C.

7. A process according to claim 1, wherein the process is carried out at a pH of 12 to 13.

8. A process according to claim 1, wherein the pH is adjusted by adding concentrated sodium hydroxide solution to the aqueous reaction mixture.

* * * * *